United States Patent [11] 3,627,150

[72] Inventors Michel G. Kazeef
  Frederick, Md.;
  Roger Soulier, Oloron, Ste. Marie, France
[21] Appl. No. 53,262
[22] Filed July 8, 1970
[45] Patented Dec. 14, 1971
[73] Assignee Compagnie Pechinery
  Paris, France
[32] Priority July 9, 1969
[33] France
[31] 6923375

[54] METHOD FOR THE STACKING OF BILLETS AND STACKER
  15 Claims, 33 Drawing Figs.
[52] U.S. Cl. ..................................................... 214/6 H,
  53/149, 53/162
[51] Int. Cl. ...................................................... B65g 57/18,
  B65g 57/06
[50] Field of Search ........................................... 214/6 D, 6
  F, 6 H, 6 K, 6 P, 6 M, 6 N, 6.5, 6 G; 198/35;
  53/162, 163, 148, 149, 150

[56] References Cited
UNITED STATES PATENTS
540,723 6/1895 Colgin ........................... 53/148 X
3,486,815 7/1969 Carrels .......................... 214/6 G Primary Examiner—Gerald M. Forlenza
Assistant Examiner—Robert J. Spar
Attorney—Mc Dougall, Hersh & Scott ABSTRACT: A stacker for cylindrical billets which permits stacking of billets of any length and diameter D formed of a mobile platform mounted for movement in the vertical and in the horizontal directions and having an inclined plane provided at its lower end with a feed nozzle and a billet-holding means cooperating with the feed nozzle for movement between blocking and unblocking position, and power-actuating means for movement of the platform vertically and in the horizontal directions to permit the platform to be placed in positions below the feed nozzle so that the billets released one by one by the feed and holding means drop onto the platform in an assigned position to form the package, and means for controlling the movement of the platform as well as the holding means.

Patented Dec. 14, 1971

INVENTORS
MICHEL G KAZEEF - ROGER SOULIER
BY

M°Dougall, Hersh - Scott ATTYS.

Patented Dec. 14, 1971 3,627,150
14 Sheets-Sheet 6
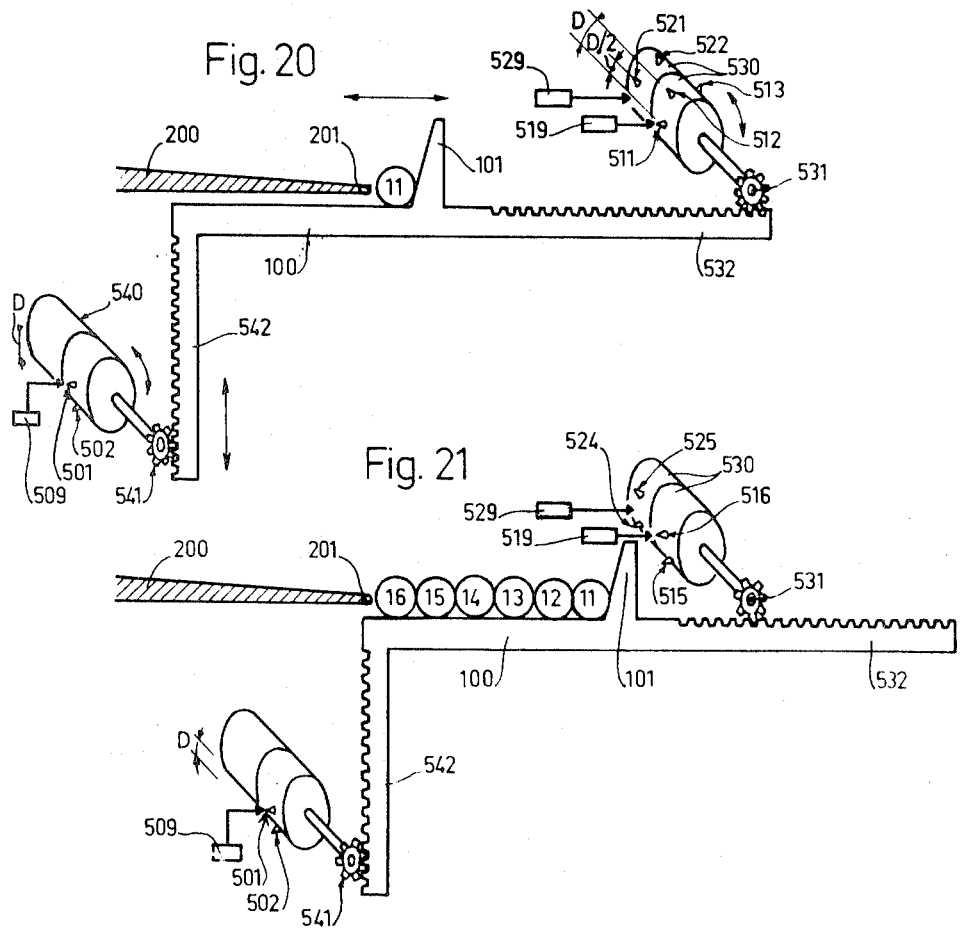
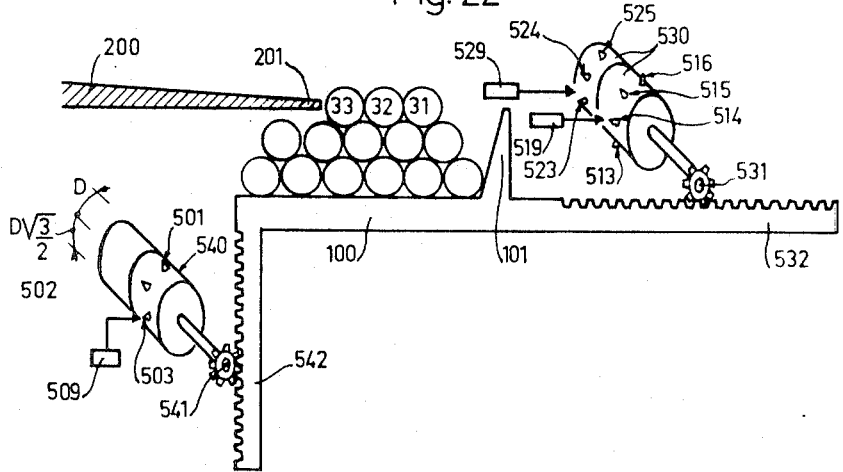

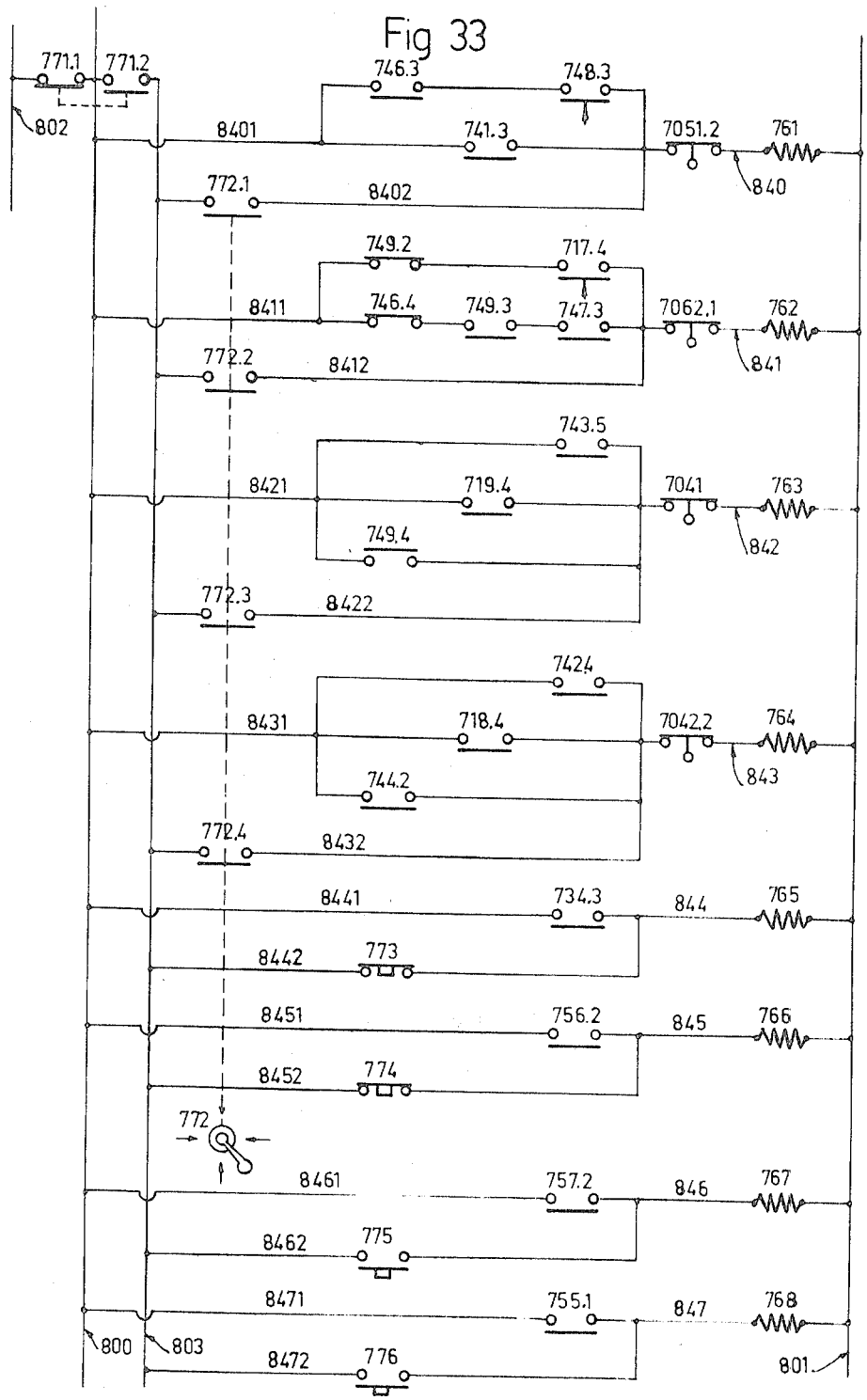

METHOD FOR THE STACKING OF BILLETS AND STACKER

This invention relates to the art of foundry practice and more particularly to the method and means for stacking billets.

The stacking of the billets is frequently done by hand, the billets being placed one by one into a structure having the external shape of the package to be formed.

However, mechanical stackers are known wherein the billets are gripped and their ends in a predetermined number to be deposited in layers into the structure. Such devices can only stack short billets, having lengths in the order of 1 to 1.5 meters, and the programming is complicated and limited to a package of a single shape.

It is an object of this invention to provide a method and means for stacking billets which permits billets of any length and diameter to be stacked to form packages of different shapes.

These and other objects and advantages of this invention will hereinafter appear and for purposes of illustration, but not of limitation, embodiments of the invention are shown in the accompanying drawing in which:

FIGS. 20-22 illustrate various phases of the operation of the stacking means in accordance with the principle of FIG. 19;

FIGS. 30-33 are diagrams of the electrical system embodied in the stacker of this invention.

The method, according to the invention, whereby the billets of a diameter D are stacked on a mobile platform, is characterized by the fact that the billets are caused to roll under the effect of gravity on a fixed inclined plane; the billet in motion is stopped at a given point of this plane in order to verify the parallelism of its axis with the direction selected for the axis of the stacked billets; the platform is horizontally moved into such a position that the location assigned the billet in the package is located below the end of the inclined plane; the billet is allowed to drop on the platform, and then is moved a length D and the action is repeated with the following billets until the stacked layer is completed; the platform is lowered and the following layer is deposited, and so forth, until the package is completed.

If the billets are arranged quinconically, their centers constitute the centers of oblique rhombi with oblique sides, the vertical translation of the platform has a value D after the deposit of the first layer, and $\sqrt{3}/2$ after the depositing of each of the subsequent levers.

The stacker, embodying the feature of this invention, comprises a mobile platform characterized by an inclined plane provided with a feed nozzle and a billet-retaining means at its lower end, the mobile platform being provided at its end opposite the feed nozzle with a fixed stop, and with motor means for horizontal translation along a direction parallel to a vertical plane perpendicular to the inclined plane and with motor means for vertical translation, said motor means permitting the placement of the platform in a position below the feed nozzle, so that the billets, released one by one by the holding means, drop on the platform, each billet occupying a predetermined position in the package to be formed, and being put in operation by a control means.

The stacking method and the stacker described hereinafter make it possible to handle billets of any length and diameter in the formation of packages of different shapes and sizes, by simple adjustment of the programming components. The shapes of packages are capable of being provided by the stacker representing all present commercial packages, as illustrated in FIGS. 1 to 6, including the package of rectangular section of billets lined up according to FIG. 6, as well as all ways of "cutting" a stack into a quincoid (FIG. 7).

Figure 1:
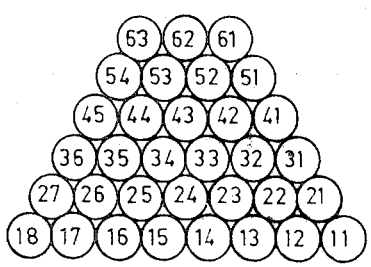
FIG. 1 is a schematic in elevation view of one form of package of stacked billets representing the practice of this invention.

In all figures the layers or tiers of billets are represented by figures from 1 to 9, with FIG. 1 being the base layer, and the billets of each tier are identified by one number, also from 1 to 9, placed after the row number of tier, No. 1 designated the billet on the far right, usually the first to be stacked. Thus No. 23 designates the third billet in the second tier.

Figure 8:
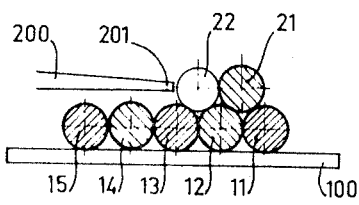
FIG. 8 is an elevational view of a principal component of the stacker.
Figure 9:
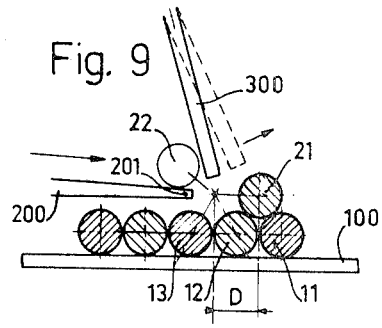
FIG. 9 is an elevational view similar to that of FIG. 8 showing the portion of the stacker in an advanced stage of operation.
Figure 10:
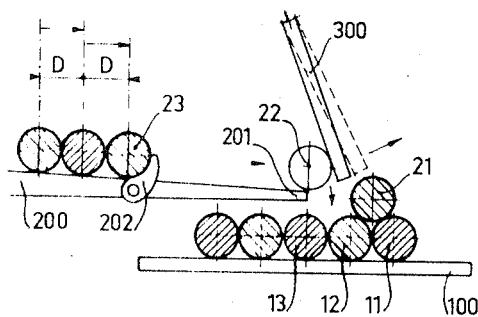
FIG. 10 is an elevational view similar to that of FIGS. 8 and 9 showing additional elements of the principal portion the stacker.

In order to be free from the stresses originating from the different lengths of the billets, the latter are not gripped but are allowed to roll by gravity on an inclined plane 200 terminating in a feed nozzle 201. Thus the movement of the billet is not controlled during the stacking operation, but the stacking movement is carried out by presenting the oncoming stacking position (FIG. 8) for a billet 22 so that the latter has no possibility other than to move to the desired position (FIGS. 9 and 10).

For this purpose, the package is formed on a mobile platform 100 which is given in horizontal translation along a direction parallel with a vertical plane perpendicular to the inclined plane 200, so that the billet 22 is to be stacked, stopped during this time (FIGS. 9 and 10) in a free fall position, by a holding means 300 drops, under the effect of its weight into the desired position. This position is generally one where its center joined with the centers of the two underlying billets 12 and 13 defines an equilateral triangle.

When a tier is deposited, the platform 100 moves downward for a distance corresponding to the spaced relation between the centers of the billets in adjacent layers in order to permit the billets of the subsequent layer to be deposited.

The free fall of the billet generally constitutes an uncontrollable movement. In commercial practice, it is useful to reduce it to a minimum, such as to one or several centimeters.

Figure 27:
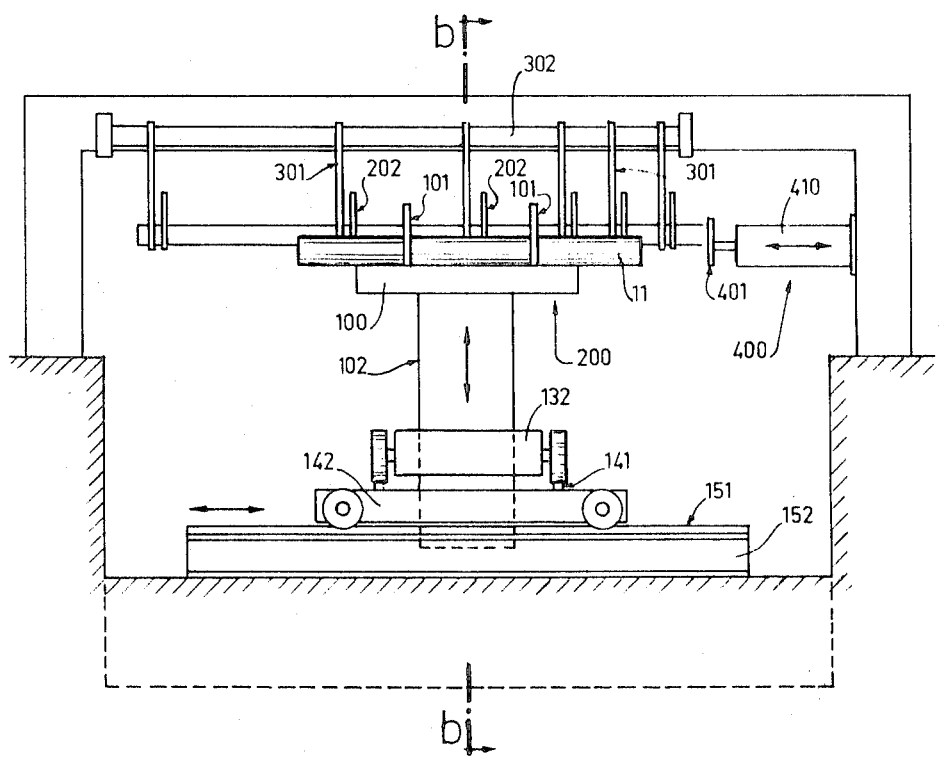
FIG. 27 is a schematic side elevational view of a stacker embodying the features of this invention.

The arrest of the billet on the holding means 300 is primarily for the purpose of realizing the parallelism between its axis and the billets already deposited, along with its lateral alignment by means of device 400 comprising a pusher 401 operated by a jack 410 (FIG. 27).

The stacker comprises an automation device based on the reproduction of a model in space.

Figure 11:
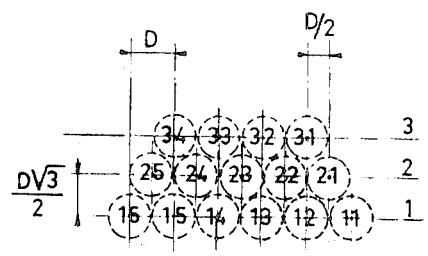
FIG. 11 is a diagrammatic view showing a sample of a billet package for purposes of explanation of a principle in the operation of the stacker.

By representing the finished stack by figuration of the center of all billets, a "skeleton" is obtained, which, when materialized, constitutes a model of the natural size of the package. This makes it possible to control the movements of the stacker platform; FIG. 11 shows such a stack, the center of the sections of the billets representing the "skeleton".

Figure 12:
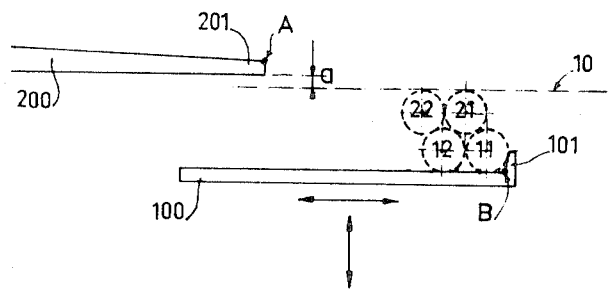
FIG. 12 is a schematic view which illustrates various parameters of the stacker.
Figure 13:
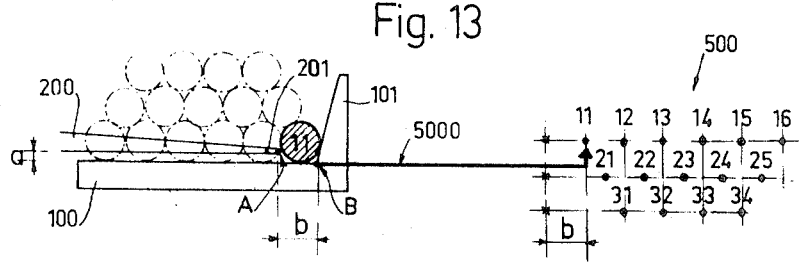
FIGS. 13-17 are schematic elevational views which illustrate the principle of operation of the feeler means.
Figure 14:
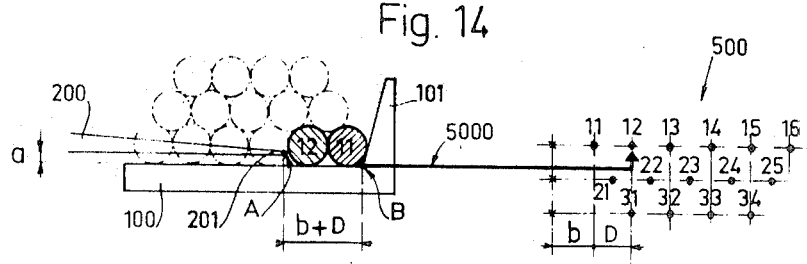
Figure 15:
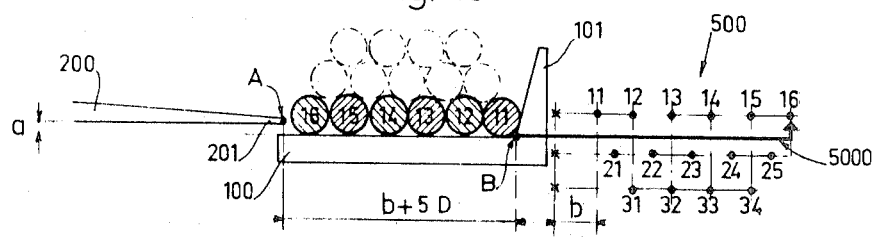
Figure 16:
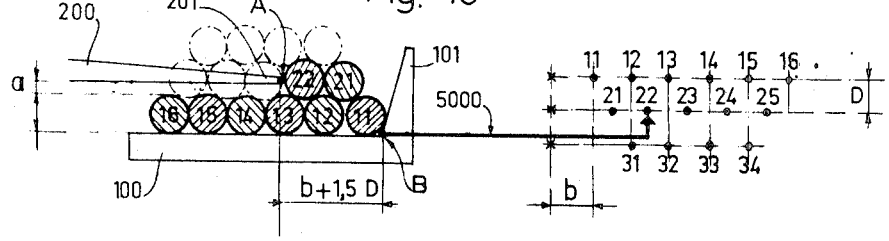
Figure 17:
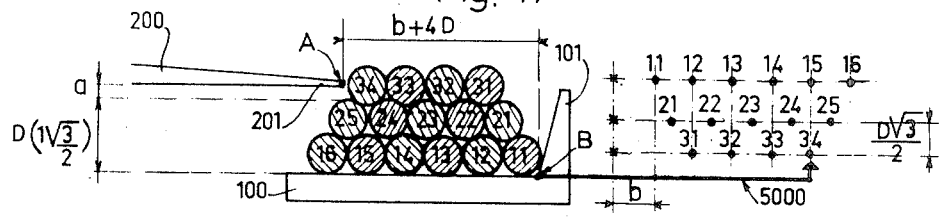

Two points (FIG. 12) are taken into consideration; one of them, A, corresponds to the end of the feed nozzle 201; the other one, B, is fixed with reference to the platform such for example with its end on the first side of the billet placed. Point B may take any position with reference to point A.

FIGS. 13 to 17 represent five stages of the formation of the package of FIG. 11. The mark of each billet has been shown to represent the axis of the billet, and the corresponding materialized point of the model 500. An arrow 5000 (FIGS. 13 to 17) represents a feeler means capable of detecting and identifying, one by one, the materialized points of the pattern and to seek, after an operation, for the following materialized points, and finally to control the movement of B to stop it when the platform 100 has reached the desired position. This feeler means is rigidly connected to the platform and it follows all of its travels.

At the beginning (FIG. 13), the feeler means is placed ahead of the point 11 of the model 500, a point representing the first billet 11 to be deposited. The latter is put in its place. The horizontal distance A–B is a function of the diameter D of the billet and of the shape of the feed nozzle 201, as well as that of a fixed stop 101 limiting the end of the platform on the side opposite that of the nozzle 201. Dimension $b$, equal to the distance from A to B, during the depositing of the first billet, is constant for a given diameter of the billet. On the other hand, a predetermined amount of play (FIG. 12) exists between the feed nozzle and the upper horizontal level 10 tangent to the billets of the tier about to be deposited.

Then the feeler means seeks (FIG. 14) for the position of the point 12 of the model and stops there, at the same time immobilizing the platform which has been moved by a length equal to a diameter D and is thus able to receive the second billet 12 at the location assigned to it in the packet. The billet 12 is allowed to fall to its place.

The operation is continued from place to place until the last billet 16 of the row (FIG. 15) has been put in its place. The feeler means then is moved from 5D, with the platform moving along with it. A counter, operated by the feeler means, stops its horizontal movement and causes the vertical downward movement by a length equal to D of the assembly formed by the platform and the feeler 5000. It then travels in the reverse direction for return to the starting point over the horizontal distance it has travelled step by step, then it starts again in the direction for depositing the billet, and stops ahead of point 21 of the model.

It should be noted that the descent equal to D is necessary after the placement of the first tier, so that the deposited billets can pass below the nozzle 201.

The second layer is deposited in the same manner as the first, but the distance A–B for the first billet becomes $b+D/2$ in view of the shifting of the billets of the second layer in relation to the billets of the deposited first layer.

The operation is continued from place to place (FIGS. 16 and 17) but the descent of the platform is no more than $\sqrt{3}/2$ D after depositing the layers subsequent to the first. In the case of the model shown, the package is finished after depositing billet 34, the last billet of the third layer.

As soon as the removal of the package is effected, the feeler means returns to its starting point, ready to seek for the site of the first billet 11 of the first row. During this trajectory and in the return operation toward the starting point after depositing the last tier, the identification function is cancelled.

Figure 18:
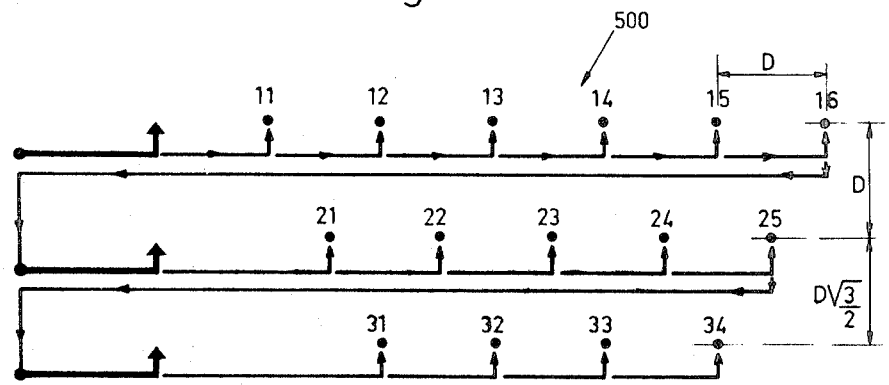
FIG. 18 is a diagram of the path travelled by the feeler means during the operations illustrated by FIGS. 13-17.

FIG. 18 shows the path traveled by the feeler on model 500 fixed in the space.

The model described can be simplified by noting that, since each package only contains billets of the same diameter, all layers of odd row on the one hand, and all layers of even row on the other hand have the centers of their billets aligned and spaced from D. The centers of the even tiers are shifted by D:2 with regard to those of the odd layers. Thus it is possible to replace model 500 of the complete package by two models of layers shifted in relation to each other by D:2, the centers being at equal distances from D on the inside of each tier. In the vertical plane, the succession of the tiers is always the same, regardless of the diameters when the first tier is completed. The platform descends by the distance D, while for all subsequent tiers, it is necessary to descend by $\sqrt{3}/2$ D, except for the package according to FIG. 6, where the descent is the distance D for all layers.

Figure 19:
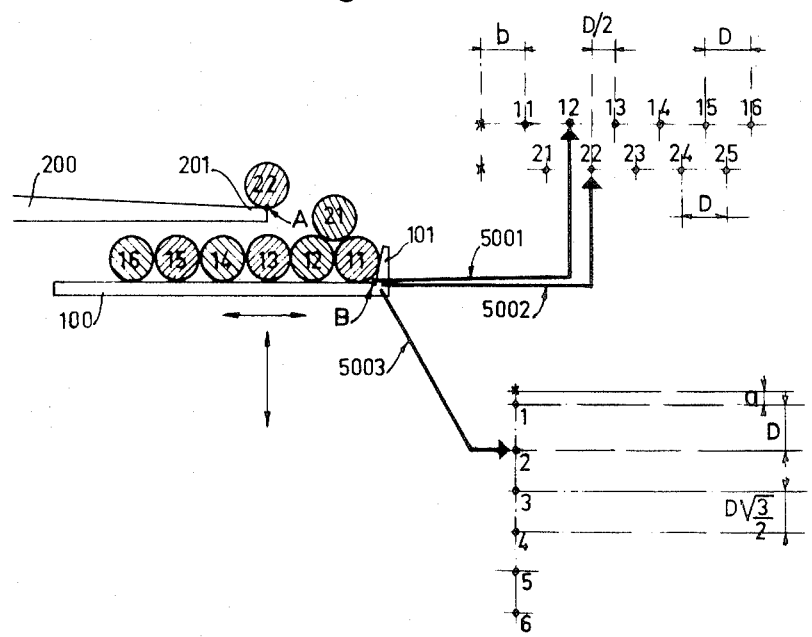
FIG. 19 is a schematic illustration of a variation in the principle for operation in accordance with FIGS. 13-17.
Figure 23:
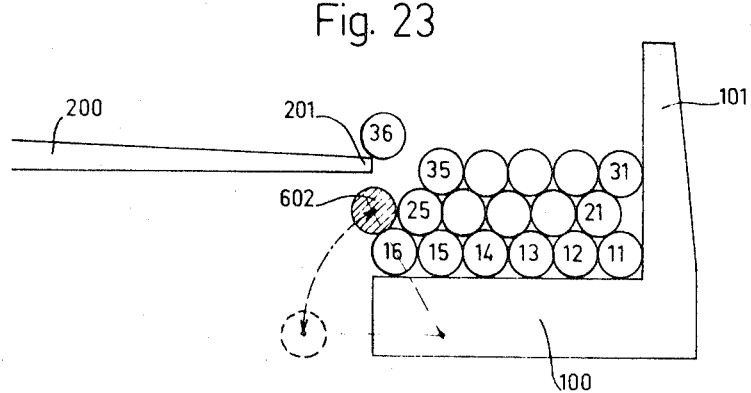
FIGS. 23, 24 and 26 are elevational views showing the formation of unstable billet packages.
Figure 24:
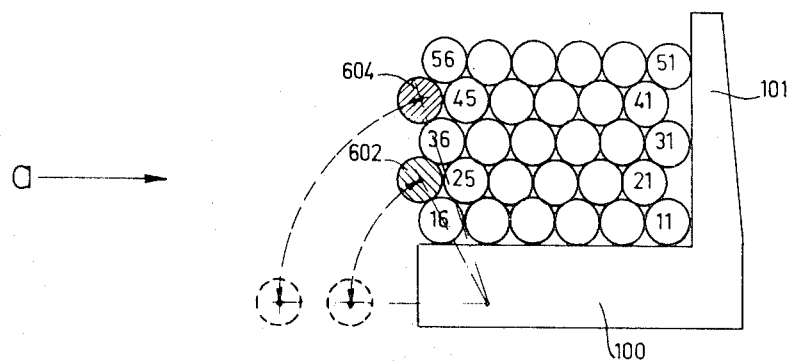
Figure 25:
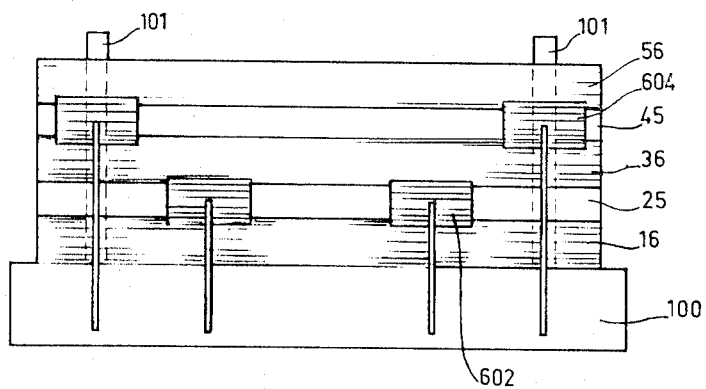
FIG. 25 is a front elevational view of the package shown in FIG. 24.
Figure 26:
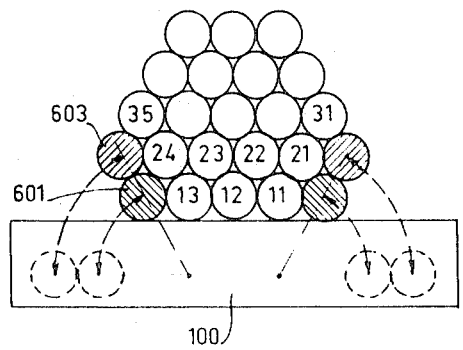

Thus, according to FIG. 19, three feelers are used: a feeler 5001 to identify the centers of the billets of the layers to odd rows, and which conditions in true size the displacement of the platform, a feeler 5002 for the identification of the centers of the billets of the even rows and finally, a feeler 5003 for the identification of the layers in the vertical plane. Both feelers 5001 and 5002 operate alternately, each only using one model of layer, regardless of the number of tiers to be stacked. The feeler 5003 controls the vertical movement of the platform and assures its placement in the correct position with consideration being given to dimension a; it is never out of circuit.

Both layer models: even (21–25) and odd (11–16) and the vertical model (1–6) constitute the complete model for a type of package and a diameter value of the billet. Thus, there are for one type of package as many models as there are different diameters to be considered, and a group of such models per type of package.

It may be noted that the feeler 5001 assures the positioning of the platform 100 for stacking billets of the tiers of odd rows. If the first layer contains $n$ billets, the odd layer model contains $n$ materialized points. The second odd layer, that is the third layer only contains $n-2$ billets. The first and last point of the model need not be identified in this case. This ban is assured by the feeler 5003 which provides the number of the layer on which the apparatus operates. The same procedure applies to the case of the even layers.

In the above disclosure of the principle of the apparatus, it has been assumed that the feeler operates the platform mechanically. The platform is mobile and moves the model ahead of the feelers which are stationary. When a billet is attached, the platform systematically receives the order to advance the order being given with a certain delay by the billet which has just been stacked and which, during the travel over the inclined plane, has operated a detector 200 upon passing a point called "zero point," as shown in FIG. 10. When the platform starts, its travel is continued, by moving the model with it, until one point of the model is presented ahead of the corresponding feeler and causes the platform to stop. This process is followed from place to place or step by step for each billet, thus for each materialized point of the model, for a given layer, when a tier is completed, a counter causes the descent of the platform until the vertical model presents a point to the feeler causing vertical movement of the platform to stop. This movement is continued until the vertical model presents a materialized stopping point to the feeler.

According to a practical embodiment (FIGS. 20–22), both models corresponding to the movements in the horizontal plane are placed on a drum 530. The latter carries two tracks of materialized points: a track 511, 512, 513, 514, 515 and 516, corresponding to the odd tiers ahead of which a feeler 519 is located and a track 521, 522, 523, 524, 525, corresponding to the even layer, with a feeler 529 placed ahead of them. The drum 530 is wedged on a pinion 531 moved by a horizontal rack 532, of one piece with the platform 100. The diameter of the drum, the pinion and the distance of the consecutive materialized points are so selected that the horizontal displacement of the platform 100 corresponds to the passage of two consecutive points in front of the feeler 519, equal to D. The materialized points 521 to 525 of the track of even layers are evidently shifted with reference to the points 511 to 516 of the track of odd row layers, by half the distance between consecutive points: D:2.

The model for the vertical displacements is arranged on a drum 540 having materialized points 501 to 503 on the periphery passing in front of a feeler 509. The drum is mounted on a pinion 541 in operative engagement with the teeth of a vertical rack 542 depending from one end of the platform 100. The diameter of the drum, the pinion and the distance between points are so selected that the vertical displacement of the platform 100 governed by the space between the feeler 509 in front of two consecutive points is D for points 501–502 and D $\sqrt{3}/2$ for points 502–503 and also for the following points, when the model contains more than three tiers.

It is noted that it is possible to associate on one drum 530 or 540 models corresponding to different packages as to their form and diameter of the billets. These models may be removable. The selection of the model chosen is effected by the displacement of the feeler(s) in front of the drum in order to bring them in front of the model corresponding to the desired package.

Figure 6:
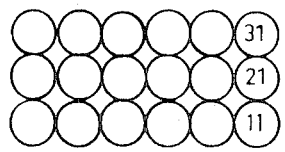
FIG. 6 is a view similar to that of FIGS. 1-5 showing another modification in the form of a billet package.
Figure 7:
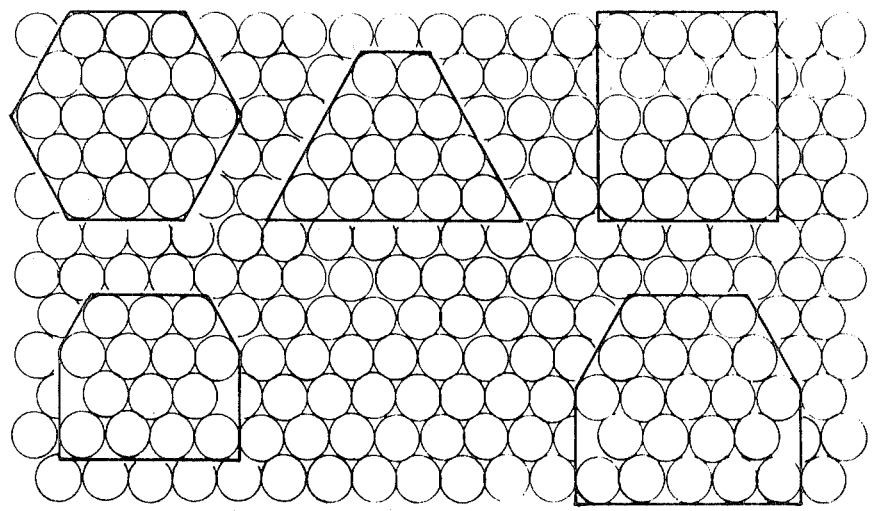
FIG. 7 is a schematic elevational view of the packages of FIGS. 1-5 in a mass of stacked billets arranged quinconically.

The package shown in FIG. 6 represents a special case. It naturally is not stable and requires a separation plank (of wood or metal) to be placed between subsequent layers. Regarding the control of the platform, the model is identical for all layers. Thus, it suffices, in the above-described apparatus, to provide a model composed of two identical tracks, track 521–525 being replaced by a track identical with track 511–516 and not shifted in relation thereto. If the machine is adapted to stack packages only according to FIG. 7, one of the tracks may be eliminated, which simplifies the equipment considerably.

Figure 2:
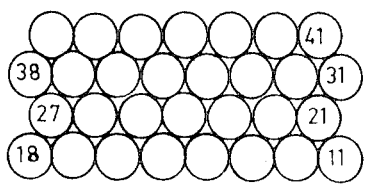
FIG. 2 is a view similar to that of FIG. 1 showing another form of package.
Figure 3:
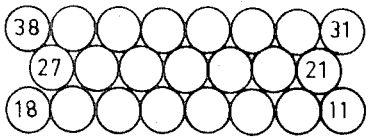
FIG. 3 is a view similar to that of FIGS. 1 and 2 showing still another form of package of stacked billets.
Figure 4:
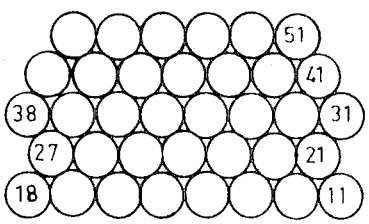
FIG. 4 is a view similar to that of FIGS. 1-3 showing a further form of stacked billets.
Figure 5:
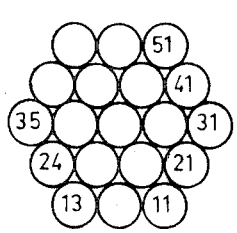
FIG. 5 is a view similar to that of FIGS. 1-4 showing a still further modification in the form of a billet package.

Certain packages are unstable because the end billets of a certain number of layers are not supported by the billets of the row immediately below. Thus, the packages of FIGS. 2, 3 and 4 are not stable, because the billets 31 and 38 are not supported by a billet of the row immediately below. Likewise, the package of FIG. 5 is unstable because the billets 21 and 24 of the second layer and 31 and 36 of the third layer are not supported. To create these packages, these billets must be supported temporarily during the stacking operation. For this purpose, false billets are employed, which are created by cylinders of low height and a diameter equal to that of the billets to be stacked (FIGS. 23 to 26). Thus, according to FIG. 23, the stability of the billet 36 about to be deposited requires the preceding placement of a false billet 602 which completes the second layer. Likewise, according to FIGS. 24 and 25, the stability of the billets 36 and 56 depends upon the placement of the false billets 602 and 604. The handling device for these false billets is mobile and adjustable, so as to be adaptable to any width of the package.

In general, the false billets are used only on the side of the platform opposite the fixed stop 101, since the latter suffices to assure the stability of the packet on the side placed against it. The package, according to FIG. 5, however, requires either a stop of a special shape assuring its stability or a double set of false billets, according to FIG. 26. In the latter case, a removable stop is preferably used when needed.

Figure 28:
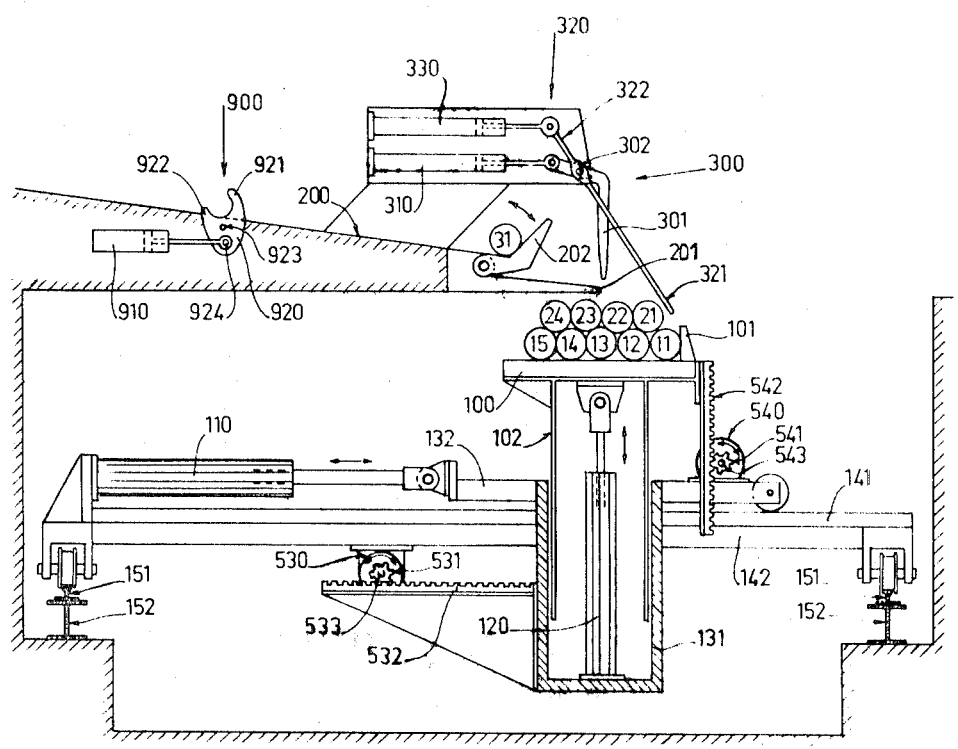
FIG. 28 is a sectional elevational view taken along the line b—b of FIG. 27.

A particular example for the embodiment of the stacker is given in FIGS. 27 and 28. The horizontal platform 100 is supported for vertical movement on jack 120 and guided by vertical guides 102. The latter are displaced in a vertical sleeve 131, suspended to a horizontal carriage 132, mounted for horizontal movement in one direction on rails 141 carried by a carriage 142 displaceable for horizontal movement in a direction perpendicular to the first on horizontal rails 151 which rest on supporting irons 152. The rails 151 are perpendicular to the rails 141 assuring the horizontal movement of the platform for the purpose of stacking.

A jack 110, connected with carriage 142, actuates the carriage 132 in horizontal movement on the rails 141. This jack is controlled by a horizontal movement distributor, not shown, provided with two energizing coils, one coil 763 for the advance, during which the billets are deposited, and the other coil 764 for the return.

The jack 120 in turn is provided with a vertical movement distributor, not shown, which is provided with two energizing coils, one coil 761 for the upward movement and the other coil 762 for the descent, during which the billets are deposited.

The platform 100 is provided at its end opposite the inclined plane with fixed stops 101, which are interchangeable, for adaptation to the form of the packages, and it is provided also with the vertical rack 542. The latter engages with the pinion 541 keyed on the vertical movement drum 540, capable of rotating about a shaft 543 which is supported by bearings fixedly to the carriage 132.

The carriage 132, and particularly the sleeve 131 fixedly connected to the carriage, carries the horizontal rack 532. It engages with the pinion 531 keyed on the drum 530 mounted for rotational movement about a shaft 533 having bearings which are supported by the carriage 142. It is noted that, insofar as the horizontal movements are concerned, the carriage 132 is fixed to the platform 100.

The carriage 142 could be stationary. It has been made mobile only to allow for its positioning with reference to the inclined plane, so as to permit proper centering of the billets on the platform 100.

The inclined surface 200 terminates at its lower end, located on the side of the platform 100, by the feed nozzle 201. It carries the "zero point" detector 202, formed by fingers activated upon each passage of a billet to make an electrical contact 702. The inclined surface cooperates with a holding device 300 capable of holding the billet on the feed nozzle at the point of being stacked. This device is formed of talons 301 mounted for pivotal movement about a fixed shaft 302; one of the arms of the talons is in position for holding the billets while the other one is pivotally connected to the piston rod of a jack 310 for actuation of the device and being controlled by an electrovalve, not shown, for rocking movement between blocking and unblocking position, but its energizing coil is identified by 766.

A device 400 is provided for aligning the billets, comprising a pusher 401 operated by a jack 410, engaged by an electrovalve, not shown, whose energizing coil is identified by 768. This device may be completed by a second symmetrical pusher.

The billets may be placed one by one on the inclined plane. In the example described, they are provided on a feed storage plane from where they are released one by one by a "sluice" 900, which is the embodiment shown comprises a mobile element 920 comprising a front holding nozzle 921 and a rear holding nozzle 922. The member 920 is pivoted about a shaft 923 and actuated for rocking movement about the pivot by a jack 910 articulated on a point 924 offset from the pivot. The jack is controlled by an electrovalve, not shown, which is energized by a coil 765. When it is in operated position, the rear nozzle 922 is withdrawn and a billet can penetrate into the cavity between both nozzles while being blocked by the front nozzle. When the jack is actuated to retracted position, the nozzle 921 is withdrawn, releasing the held billet but the oncoming billet is blocked by the rear nozzle 922, raised to blocking position and is held against penetration of the space between the nozzles until the jack has resumed its operated position. Thus the billets are released one by one.

According to a variant, the sluice means may be eliminated, providing a step by step device is used for the holding device 300, analogous to the one described as sluice means and that the zero point contact is placed ahead of this device. The holding means is no longer placed in the immediate vicinity of the feed nozzle 201 and the alignment means 400 also is moved so as to remain to the right of the holding means.

The apparatus may advantageously be completed by a safety means for the first billet of each tier. This means 320 prevents the first billet of a layer from rolling beyond the first billet of the preceding layer and from falling off the platform. It comprises fingers 321 mounted to pivot about the shaft 302 and hinged, at their upper end 322 on the end of the piston rod of a jack 330, controlled by an electrovalve, not shown, and energized by a coil 767.

Figure 29:
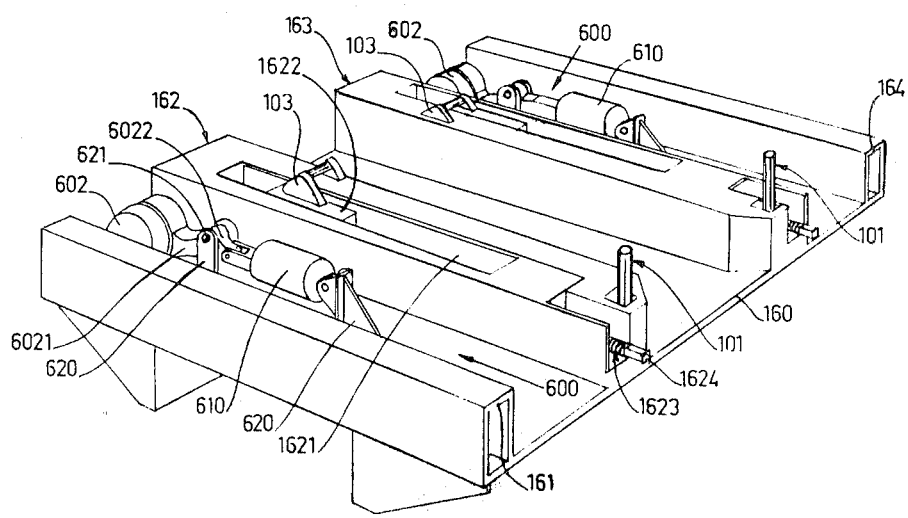
FIG. 29 is a perspective view of the movable platform of the stacker.

As shown in FIG. 29, the platform 100 comprises a support plate 160 carrying four profiles 161 to 164 on which the deposited billets rest. Each of the lower profiles 162 and 163 are provided with a groove 1621, in which a part 1622 supporting a mobile stop 103, capable of preventing any movement of the last billet of the first layer, can slide. Part 1622 carries an invisible threaded perforation having a screw 1623 terminating in an entertainment square 1624 extending into said perforation.

A mechanism 600 of a false billet 602 is located in each of the free spaces between profiles 161 and 162 on the one hand and 163 and 164 on the other hand. Each mechanism is provided with a jack 610 for assuring actuating the effacing and positioning of the false billet. The mechanism includes a support 620 to which a shaft 621 is fixed and about which an arm 6021 of a false billet is pivoted. The other end 6022 is hinged to the mobile rod of the jack 610. The support 610 can be fixedly connected to the part 1622 which carries the adjacent mobile stop. The latter and the mechanism 600 can then be moved with the aid of the same screw 1623.

The surfaces on which the billets rest may be provided with a lining of great hardness, stellite for example.

By way of an example, an electrical control device will now be described which corresponds to a particular embodiment of the stacker (FIGS. 30-33).

This control device is intended for a stacker for the formation of trapezoidal packages, as shown in FIG. 1, and which thus does not make use of false billets. Seven types of packages are provided, identified by references, namely:

P1 for a package of six, five, four, three billets,
P2 for a package of six, five, four billets,
P3 for a package of five, four, three, two billets,
P4 for a package of five, four, three billets,
P5 for a package of four, three, two billets,
P6 for a package of four, three billets, and
P7 for a package of three, two billets The figures indicate the number of billets in each layer, starting with the base layer. Consequently, package P5 consists of a base layer of five, a second layer of four and a third layer of three billets.

The device permits manual control by reason of a "manual-automatic" switch 771 with two contacts 771.1 and 771,2, a manual switch 772 with four separate contacts for rest positions in the form of contact pushbuttons 773–776.

The automation circuit comprises a start button 709, a package switch 700 with seven contacts 70011 to 700.7 and passage or end of stroke contacts whose marks, starting with FIGS. 7 and 0, include three or four figures. Some of these contacts are multiple, the different members then being identified by a separate order number which is separated by a decimal point: 7041.1 and 7042.2.

The circuit also comprises relays identified by a number of four figures likewise identifying the coil of the relay. The contacts controlled by the same relay are identified by an order number separated by a decimal point. Thus, 733.1 identifies the first contact of relay 733.

On the diagrams the contacts always are shown in their resting position. Thus, contact 707 is closed in resting position, while contact 742.4 of relay 742 is open in resting position. Some relay contacts are delayed, the direction of delayed operation is indicated by an arrow.

In the description that follows, only the contacts closed in resting position are identified as such, the contacts for which no indicating is furnished are open in resting position.

The device (FIG. 30) uses six relays 711 to 716 for counting the billets of each layer, the number of these relays corresponding to the number of billets of the most important layer: if some of the packages to be created include at least one layer of for example six billets, six relays would have to be provided. Likewise, four relays 721 to 724 are used, each of which corresponds to one layer of billets. A rotary cyclical switch 730 makes it possible to energize one by one the relays 711 to 716, starting with the latter, but none of the relays 712 to 716 can be engaged unless the preceding relay is already energized. When less than six billets must be deposited, a number of relays equal to the complement of six of the number of billets to be deposited is energized at the start and nothing happens when the cyclical switch tries to energize them in its turn.

This preliminary energizing is obtained by means of a package shaped switch 700 comprising seven contacts marked 700.1 to 700.7.

The closing of the contacts enumerated on the same line corresponds to each type of package indicated above:

Package P1: contacts 700.4 and 700.7 closed,
Package P2: contacts 700.4 and 700.6 closed,
Package P3: contacts 700.1 and 700.7 closed,
Package P4: contacts 700.1 and 700.6 closed,
Package P5: contacts 700.1 and 700.6 closed
Package P6: contacts 700.1 and 700.5 closed.

The rotary cyclical switch 730 comprises a rotor controlling 13 contacts 730.1 to 730.13. The 400° of rotation of the rotary switch comprise eight sectors numbered from 1 to 8, and a starting position, located between the adjacent sectors 1 and 8. Each of the 13 contacts is opened or closed, when the rotary switch is in start or on position, when it is on one of the positions 1 to 8 or finally when it is astride on two consecutive sectors. The contact 730.1 is closed for all sectors 1 to 8 but open in starting position; contact 730.2 is closed on the sectors 4 to 8 and in starting position; contact 730.3 is closed in starting position and when the rotary switch is astride on the sectors 7 and 8; contacts 730.4, 730.6, 730.8 and 730.10 are closed when the rotary switch is astride respectively on sectors 1 and 2, 2 and 3, 3 and 4, 7 and 8; contacts 730.5, 730.7, 730.9 are closed for the respective sectors 2, 3 and 4; all contacts 730.3 to 730.10 remain closed during one-eighth of a turn of the rotary switch. Contact 730.11 is closed in starting position and on sectors 1 to 6; contact 730.12 is closed permanently except on sector 5, and contact 730.13 is closed on sectors 3 and 4.

The control of the electrical equipment is assured by the passage of end of stroke contacts; 701 is closed when billets are present on the feed table located ahead of the stacker, before the inclined plane 200, 702 is operated by the detector 202 of passage to "zero point," 7031 is operated by the feeler 519 in the path of the odd layers, 7032 is likewise operated by the feeler 529 in the path of the even layers, 7041 and 7042 respectively detect the maximum advance of the platform 100 for evacuating the finished platform and the maximum return of the platform for stacking, 7051 to 7054 are operated by the feeler 509 and respectively correspond to the four layers to be deposited in case of packages of greater height, 7062 detects the extreme low position, finally 707 detects the possible presence of a billet or package on the platform prior to stacking and prohibits the start of a new cycle as long as the platform is not empty. 709 is the starter button for the stacking of a package.

It is noted that some of these contacts are double, the two independent parts are differentiated by an ordinal number following the principal mark: thus, contact 7051 has two parts with the respective identification numbers 7051.1 and 7051.2.

The contacts are shown in resting position: contact 7052 is open in resting position, while contact 707 is closed in resting position.

Figure 30:
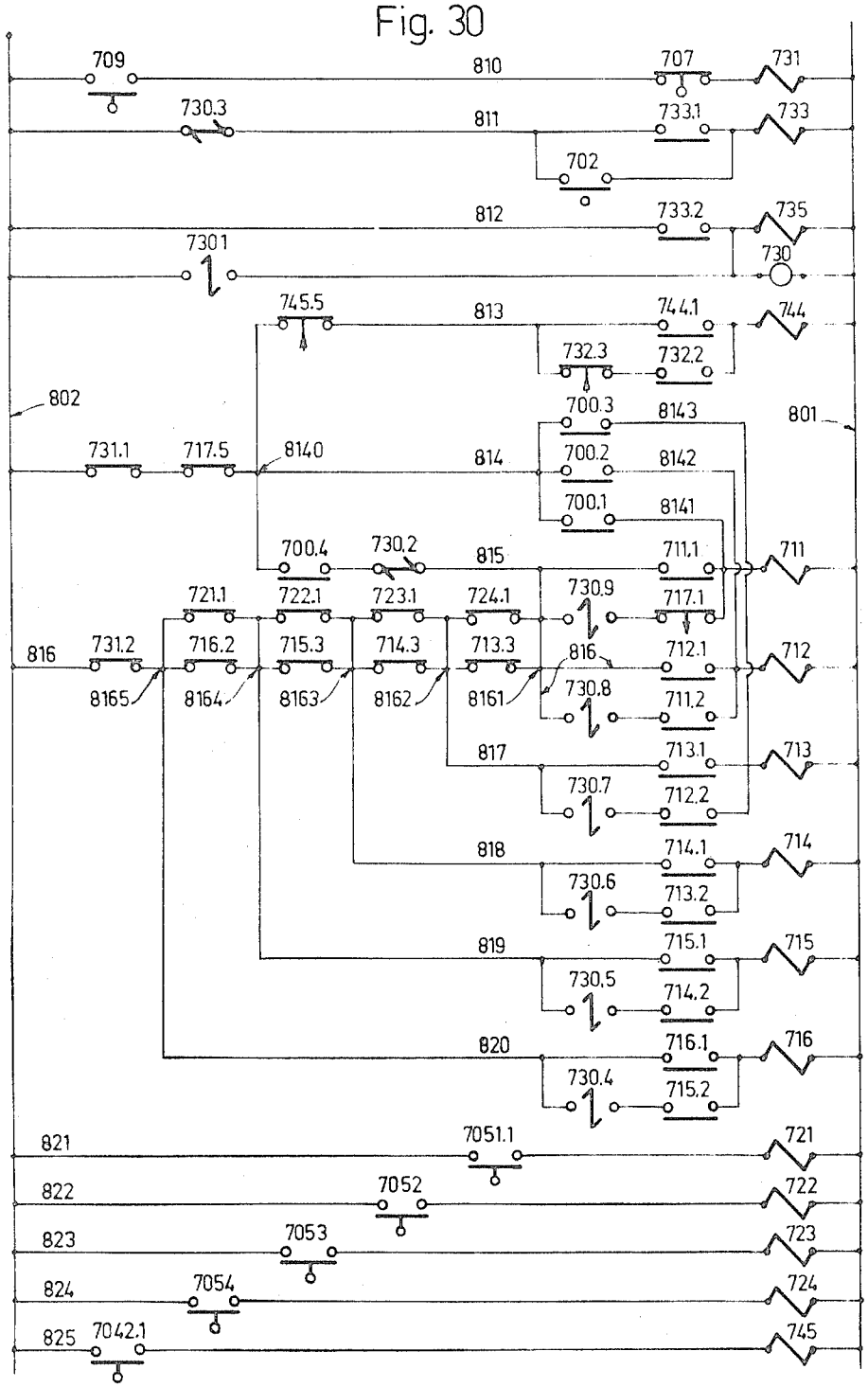
Figure 31:
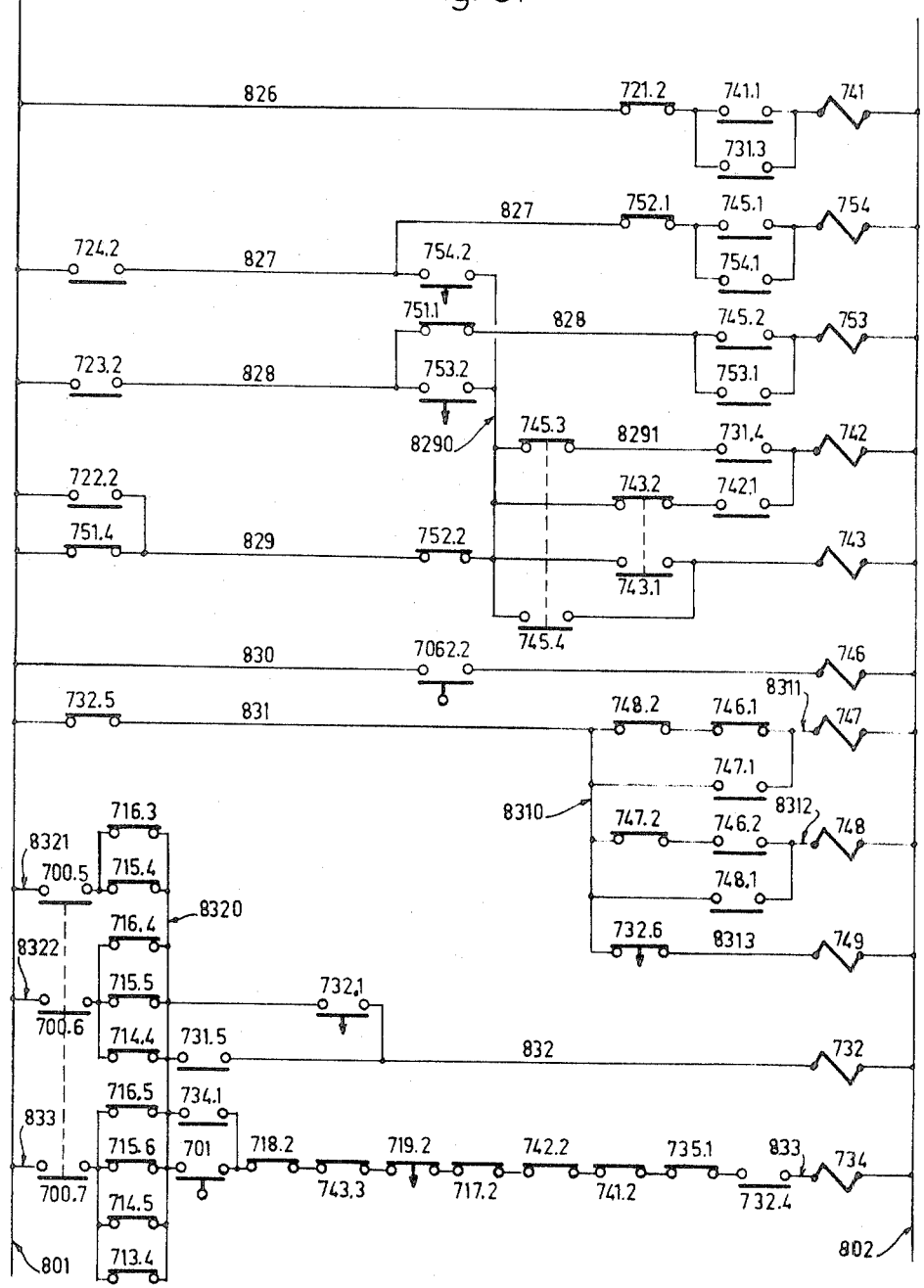
Figure 32:
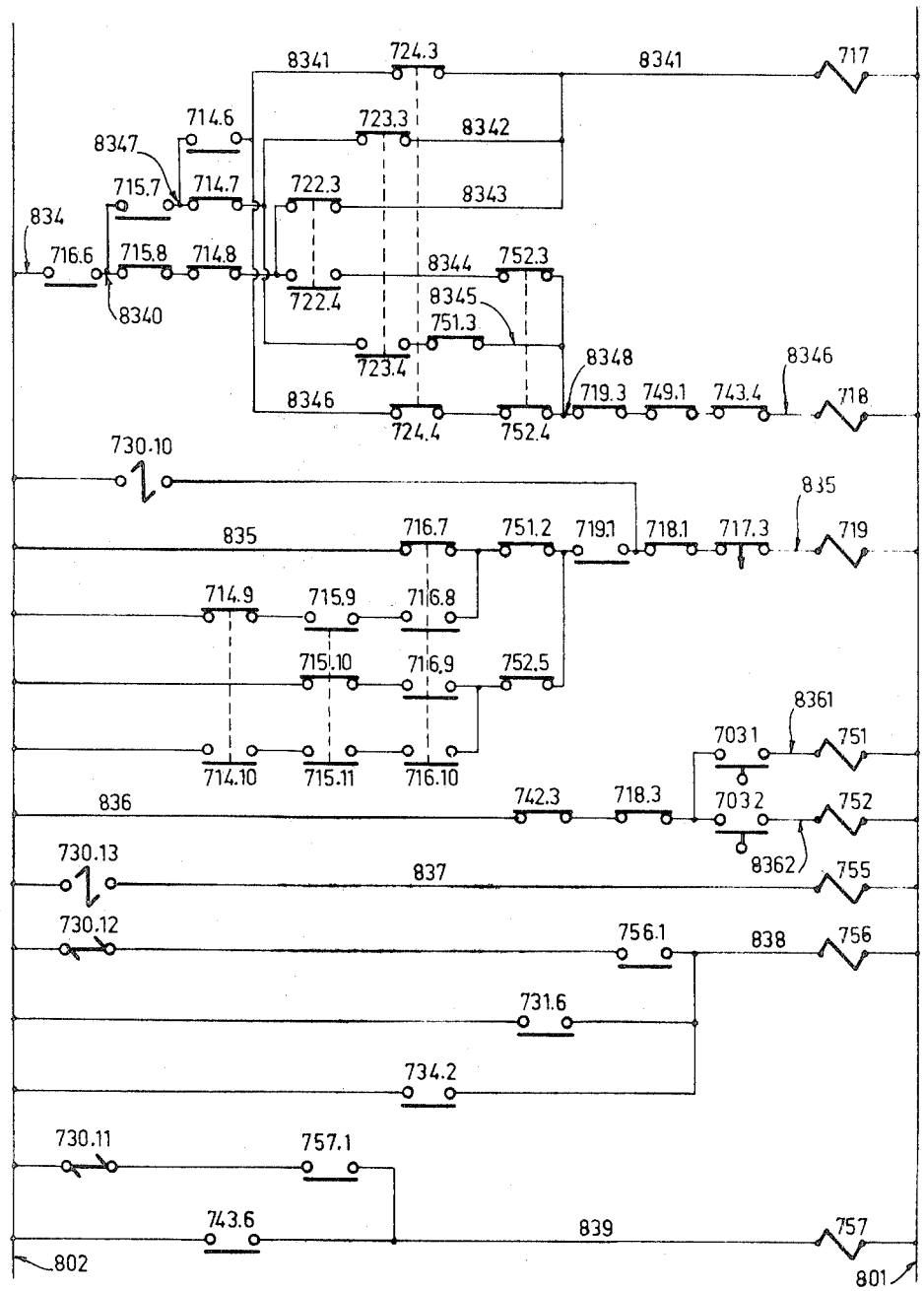

The cyclical analysis and billet counting device of a layer according to FIG. 30 comprises a series of lines mounted parallel between two feed conductors 801 and 802.

Line 810 comprises, mounted in series, the coil of a relay 731 for stacking control, the closed contact 708 when the platform is empty, and starter button 709. Line 811 likewise comprises the coil of a cyclical control 733, a hooking contact 733.1 for this relay, shunted by the contact 702 of the "zero point" 202 and contact 730.3 of the cyclical rotary switch 730. Line 812 comprises the latter and the coil of a cyclical switch relay 735 connected in parallel, said assembly being mounted in series with a contact 733.2 of relay 733 and contact 730.1 of the cyclical contact.

Then three lines are found, mounted between the conductor 801 and a point 8140, the latter being connected to line 802 by two contacts closed in resting position: 717.5 of a relay 717, and 731.1 of a relay 731; these three lines are:

813 comprising the coil of a maximum return relay 744, a contact 745.5 closed in resting position, a maximum return end of stroke relay 745 and a circuit containing contact 732.2 of an end of cycle relay 732 and contact 732.3, closed in resting position and delayed by two seconds at the opening of the same relay, mounted in series and in shunt on these two contacts, and the hooking contact 744.1 of relay 744;

814 connected by contacts 700.1, 700.2 and 700.3 of the packet switch 700, respectively to lines 8141, 8142 and 8143 which respectively terminate at the coils of the relays 711, 712 and 713, and on the other hand, they are connected to the conductor 801;

815 comprising, mounted in series, contacts 700.4, 730.2 and 711.1 and finally the coil of the relay 711 whose contact 711.1 assures the connection; in parallel on this contact, contact 717.1 and contact 730.9 are found mounted in series.

Between the common point 8161 between contacts 711.1 and 730.2 and conductor 802 there is a step circuit forming part of line 816, and comprising, starting from conductor 802: a contact 713.2 closed to resting position, then, four groups of two contacts closed in resting position and mounted in parallel, these groups themselves mounted in series and comprising:

Between points 8165 and 8166 contacts 721.1 and 716.2;
between points 8164 and 8163 contacts 722.1 and 715.3;
between points 8163 and 8162 contacts 723.1 and 714.3;
between points 8162 and 8161 contacts 724.1 and 713.3:

Between each of the points 8161 to 8165 and conductor 801 there are connected the continuation of line 816 and of lines 817 to 820, each comprising the winding of the respective relays 712 to 716, in series with its respective hooking contact 712.1 to 712.6 and, shunting this contact, a contact 730.8 to 730.4 of the cyclical switch 730, mounted in series with a contact 711.2 to 715.2 of the relay mounted in the preceding line.

Then there are four lines 821 to 824 each of which contains the coil of one of the relays 721 to 724 in series with a contact 7051.1 to 7054, operated by the drum of the corresponding tier.

Line 825 comprises the coil of a relay 745, a maximum return end of stroke relay, mounted in series with a first maximum return end of stroke contact 7042.1 of the platform. This end of stroke includes a second contact 7042.2.

Line 826 contains, connected in series (FIG. 31), the coil of a relay of maximum ascent 741, the hooking contact 741.1 of this relay, shunted by the contact 731.3 and the contact 721.2 closed in resting position.

Line 827 contains, likewise in series, the coil of a control relay 754 of the first billet of the fourth layer, the hooking contact 754.1 of this relay, shunted by a contact 745.1, a contact 752.1 closed in resting position of a relay 752 for the control of the even layers and a contact 724.2. A line 828 contains, in series, the winding of a control relay 753 of the first billet of the third layer, a contact 745.2 shunted by a contact 753.1, a contact 751.1 closed in resting position, of a relay 751 for the control of the odd layers and a contact 723.2 Line 829 contains a contact 722.2 shunted by a contact 751.4 closed in resting position, a contact 752.2 closed in resting position. From the point 8290, representing the second pole of this contact, the line is divided between two branches: one branch, 8291, comprising a contact 745.3 closed in resting position, a contact 731.4, the total of these two contacts being shunted by two other contents 742.1 and 743.2, the latter closed in resting position, connected in series, and the winding of a return relay No. 1 (742), the other branch 8292, comprising a contact 745.4 shunted by a contact 743.1 and the coil of a forward No. 1 return 743. The point 8209 common to these two branches also is connected on the one hand to line 827 at the junction point of contacts 752.1 and 724.2, by a contact 754.2 delayed by three seconds at the opening, on the other hand to line 828 at the junction point of contacts 751.1 and 723.2 by a contact 743.2 likewise delayed.

Line 830 contains the coil of a position relay 746 of the table for removal, in series with the end of stroke contact 7062.2.

Line 831 contains three branches, one branch 8311, comprising the coil of a control relay 74 of the evacuation position and two contacts 746.1 and 748.2, both closed in resting position, the assembly of both contacts being shunted by a hooking contact 747.1 of relay 747; the contact 748.2 belongs to an ascending evacuation relay 748. The second branch, 8312, comprises the coil relay 748 and two contacts 746.2 and 747.2, the latter closed in resting position; the assembly of these two contacts is shunted by a hooking contact 748.1 of relay 748. Finally, the third branch 8313 contains the coil of a relay 749 for descending evacuation and a contact 732.6 closed in resting position and delayed at opening. These three branches are connected at their base, at one point 8310, which in turn is connected to the conductor 802 by means of a contact 732.5, closed in resting position.

The next two lines 832 and 833 have a common point 8320. Between this point and the conductor 801, there are, in line 832, the end of cycle control relay winding 732 and two contacts 732.1, delayed at the opening, and 731.5, mounted in parallel, and, in line 823, the coil of a sluice control relay 734, contacts 732.4, 735.1, 741.2, 742.2, 717.2, 719.2, delayed at closing of an advance No. 2 relay 819, 743.3, 718.2 of a return No. 2 relay 718, and the assembly made up by two contacts 734.1 and 701, mounted in parallel, contacts 732.4, 734.1 and 701 being open only in resting position. Between point 8320 and conductor 801 there are three branches mounted in parallel: branch 8321 contains a contact 700.5 and two contacts 716.3 and 715.4 mounted in parallel and closed in resting position, branch 8322 comprises one contact 700.6 and three contacts 716.4, 715.5 and 714.4 mounted in parallel and closed in resting position, while branch 833 comprises a contact 700.7 for four contacts 716.5, 716.6, 714.5 and 713.4, closed in resting position and mounted in parallel.

Line 834 is divided (FIG. 32) into six branches which are joined two by two to end up at a joint 8340 connected to the conductor 802 by a contact 716.6. Branch 8341 comprises the winding of the relay 717 and a contact 724.3 closed in resting position. Branch 8346 comprises the coil of return No. 2 relay 718 and contacts 743.4, 749.1 of a descent evacuation relay 719.3, 752.4 and 724.4, all closed in resting position; at their base these two branches 8341 and 8346 are joined and both are connected to a point 8347 by a contact 714.6; the junction point of contacts 719.3 and 752.4 carries the number 8347. Branch 8342 starts from the point common to the coil 717 and contact 724.3 and includes the contact 723.3, closed in resting position; branch 8345 starts from the point 8348 and includes contact 751.3, closed in resting position, and contact 723.4; at their base, these two branches 8342 and 8343 are joined and both are connected to point 8347 by a contact 714.7, closed in resting position. Point 8347 in turn, is connected to point 8340 by a contact 715.7. Branch 8343 which starts from the point common to the coil 717 and contact 724.3 of branch 8341 contains a contact 722.3, closed in resting position. Branch 8344 starting from point 8348 contains a contact 752.3, closed in resting position, and a contact 722.4; at their base these two branches 8344 and 8348 join and are connected to point 8340 by two contacts 714.8 and 715.8, closed in resting position and connected in series.

Line 835 contains the advance No. 2 relay coil 719 and the following contacts 717.3 delayed at closing and 718.1, both open in resting position, 719.1 open in resting position, 751.2 and 716.7 closed in resting position. Between the point common to the contacts 718.1 and 719.1 and the conductor 802, the contact 730.10 of the cyclical switch is connected. Between the point common to the contacts 719.1 and 751.2 and the same conductor 802, there are connected: contact 752.5, closed in resting position, 716.9, open in resting position, and 715.10, closed in resting position. Between the point common to the contacts 751.2 and 716.7 and the conductor 802, there are the contacts 716.8, 715.9 and 714.9, the latter closed in resting position. Finally, between the point common to the contacts 752.2 and 716.9 and the conductor 802, there are located the contacts 716.10, 715.11 and 714.10.

Line 836 contains, from conductor 802, two contacts 742.3 and 718.3, both closed in resting position; it then is split into two branches: one, 8361, comprising the contact 7031 of the feeler 519 of the odd layers and the coil of the control relay 751 of the same layers; the other one 8362 comprising the contact 7032 of the feeler 529 of the even layers and the coil of the control relay 752 of the same layers.

Line 837 contains the coil of a control relay 755 for the alignment of the billets and a cyclical switch contact 730.13.

Line 838 contains the coil of a relay 756 of the holding device 300, the hooking contact 756.1 of this relay and the cyclical switch contact 730.12; between the point common to the coil 756 and the contact 756.1 and the conductor 802, the contacts 731.6 and 734.2 are connected in parallel.

Finally, line 839 contains the coil of the safety valve 757 of the first billet of each layer, the hooking contact 757.1 of this relay and a contact 730.11 of the cyclical switch; between the point common to the coil 757 and the contact 757.1 and the switch 802, a contact 743.6 is connected.

FIG. 33 shows the arrangement of the control diagram for the distributors assuring the operation of the jacks. The control may be automatic or manual. The manual/automatic switch 771 has two contacts: contact 771.1 is connected between the general feed conductor 800 and the conductor 802, assuring the feeding of the automation devices of FIGS. 30 to 32, while contact 771.2 is connected between the conductor 800 and a manual feed conductor 803. The manual control is achieved by a manual control switch 772 with four positions separated by neutral points having four contacts 772.1 to 772.4, one of these contacts, and only one is closed for each position. Finally, four shutoff pushbuttons 773 to 776 control accessory operations.

Each distributor coil is fed by an automation circuit connected to the general conductor 800, under tension, and by a manual circuit which is under tension only if the contactor 771 is in the corresponding position.

Line 840 contains a coil 761 of the distributor of the jack 120 for the vertical movement, assuring the ascent of the platform and a contact 7051.2, closed in resting position, and operated by the drum 540 in depositing position of the first layer; the line is divided into two branches, one 8401, connected to the conductor 800, has contacts 746.3 and 748.3, the latter delayed at opening, mounted in series and shunted by a contact 741.3, while the other 8402, connected to the conductor 803, has a contact 772.1 of the contactor 772.

Line 841 includes the other coil 762 of the distributor of the jack 120 for the descent of the platform and a contact 7062.1 of the extreme low position, closed in resting position; the line then is divided into two branches, one 8411, connected to conductor 800, contains three contacts 747.3, 749.3 and 748.4, the latter closed in resting position. These contacts are shunted by two contacts mounted in series: 717.4 delayed at opening and 749.2, the latter closed in resting position, while the other branch 8412, connected to conductor 803, includes a contact 772.2.

Line 842 contains a coil 763 of the distributor of the jack 110 for the horizontal movement, for the advance of the table and a contact 7041, closed in resting position, and detecting the maximum advance of the platform; it then is divided into two branches, one 8421, connected to the conductor 800, comprises three contacts mounted in parallel: 743.5, 719.4 and 749.4, the other one 8422, connected to the conductor 803, has a contact 772.3.

Line 843 contains the coil 765 of the distributor of the jack 110, assuring the retraction of the platform, and the contact 7042.2, closed when in resting position, for the return end of stroke of the platform; it then is divided into two branches, one 8431, connected to the conductor 800, has three contacts 742.4, 718.4 and 744.2, mounted in parallel, while the other one 8432, connected to conductor 803, has one contact 772.4.

The last four lines 844 to 847 relate respectively to the following coils: 765 of the distributor operating the sluice gate 900, 766 of the distributor controlling the jack 310 of the holding means, 767 of the distributor controlling the jack 320 of the safety of the first billet of each layer, and 768 of the distributor of the jack 410 for the alignment of the billets.

Each line contains the coil 765 for 844, 766 for 845, 767 for 846 and 768 for 847, followed, on the one hand, by a contact 734.3 respectively 756.2, 757.2 and 755.1 connected to conductor 800; on the other hand, by a manual contactor 773 respectively 744, closed in resting position, 775 and 776, connected to conductor 803.

The apparatus described operates in the following manner:

The conductors 800 and 801 are connected to a current source. Then switch 771 is operated, in order to put it into the position corresponding to the type of operation desired: for manual, contact 771.2 is closed, or for automatic, contact 771.1 is closed.

In manual operation, conductor 803 is under tension, while conductor 802 is not fed. This takes the automatic equipment represented in FIGS. 30 to 32 out of circuit. The automatic contacts of FIG. 33 are fed by the conductor 800, but, since in each line or branch, at least one contact is open in resting position, coils 761 to 768 are not fed by these contacts.

The platform is in maximum advance, position of removal of the preceding package. Switch 772 is placed in closed position 772.1, the other contacts then are necessarily open; coil 761 is so energized that the jack 120 projects its shaft until contact 7051.2 opens; the platform is in vertical position for depositing the first layer. Then switch 772 is placed into closed position 772.6 until the platform occupies the position corresponding to the depositing of the first billet 11 which in general corresponds to the opening of the contact 7042.2 of maximum return of the platform. The billet is in place between the sluice fingers 900; the switch 773 is operated, jack 910 retracts its shaft, finger 821 is withdrawn, releasing billet 11, while the finger 922 holds the second billet 12. When 773 is no longer acted on, the member 920 of the sluice means resumes its resting position, billet 12 taking its place between the fingers 921 and 922. The holding means 300 which is in closed position, jack 910 having its shaft outward, stops billet 11 in its course. Switch 776 is operated; the jack 410 has its shaft extended, the pusher 401 pushes the billet 11 until alignment is accomplished. Finally, switch 774 is operated, jack 310 retracts its shaft, the fingers 301 are withdrawn in up position; billet 11 drops on the platform. Then the platform 100 is moved forward by a length equal to D, the diameter of the billets to be stacked, then we start again to deposit the other billets 12 to 15 of the layer. The billets are held between the fixed stop 101 and the mobile stop 103. For the billets other than 11, the stop of the recoil movement is controlled by placing switch 772 in neutral position (positions included between the active positions indicated by arrows in FIG. 33).

Then the switch 772 is operated so as to close the contact 772.2 for the time necessary to cause the platform to descend by D, then the contact 772.3 is closed for the time necessary for the platform to take the deposit position of the first billet 21 of the second layer. This billet then is deposited by proceeding as explained, but, during the drop of the billet, switch 775 is operated so as to cause the fingers 321 of the safety device of the first billet to drop, to prevent the latter from jumping above billet 11 in response to its fall.

After the depositing of the second layer, the panel is caused to descend $\sqrt{3}/2$ D and we proceed as above until the package is completed. Then the switch 712 is put in closing position of contact 712.3 until the opening of the end of stroke contact 7041 stops the movement.

Now the package has to be removed with an evacuation means of prior art, such as a claw.

In automatic operation, conductor 803 is no longer fed, which prevents any untimely action on the manual control buttons from disturbing the operation of the stacker. The conductor 802 of the feed device of the automatic system is placed under tension.

In the first phase of placing the platform for depositing the first billet 11 of the first layer, button 809, line 810, is operated which energizes relay 731 as long as this action lasts. Then the relays 732, line 832, are energized which, with the aid of relay 744, line 813, causes the platform to retract (coil 765, line 843), (741, line 8291) which, with the aid of relay 734, line 833, blocks the sluice means (coil 765, line 844) and (765, line 838) putting the holding means in closed position (coil 766, line 845).

The ascent of the platform is stopped by cutting the contact 7051.2 operated by the vertical movement drum, said contact cuts the coil 761, while the twin contact 7051.1, closed at the same time, energizes the relay 721, line 821, of the first layer, which deenergizes the relay 741. The recoil of the platform is stopped by opening the contact 742.2, while the corresponding contact 7042.1 is closed and energizes relay 745, line 825, which with the aid of relay 743, line 829, causes the platform to advance (coil 783, line 842) and through relay 757, line 839, places the fingers 321 in place, which constitute the first billet safety of a layer (coil 767, line 867) and finally deenergizes the relay 744. Relay 745 is deenergized as soon as the maximum end of stroke contact 7042.1 of the platform is cut.

The advance of the platform is stopped by contact 7031, operated by the horizontal movement drum, when the platform is in horizontal position for depositing the first billet, by relay 751, line 8361, which, energized by the contact, deenergizes relay 743, cutting the feed of coil 763 and of relay 742.

In a second phase, the deenergization of the relay 742 energizes relay 734 causing the operation of the sluice means (coil 765) and the start of the billet 11.

The third phase relates to depositing the first layer. In a first part in response to the depositing of the first billet, the latter passes to the "zero point" 20, closing during its passage the contact 702, which hooks the relay 733, line 811, because the contact 730.3 of the cyclical switch 730 is closed, the latter being in its starting position. Relay 733 on the one hand deenergizes 734, closing the sluice means again; on the other hand it energizes relay 735, line 812, and starts the cyclical switch whose contact 730.1 is closed, hooking the relay 735 and the switch 735 during the cycle.

In the circuit of the relays 711 to 716, lines 815 to 820, the contacts 700.1 to 700.3 are open, 700.4 is closed. Contact 730.3 is open for sectors 2-6, deenergizing relay 733 and contact 730.12 is closed, maintaining the holding means closed, except in sector 5.

When the switch passes through sectors 1-4, contacts 730.4 to 730.8 are closed successively, but without being able to energize the relays 716 to 712, because an open contact, operated by the relay preceding the "tested" relay is in series with each contact of the switch. On the other hand, since the relay 717, line 834, is deenergized, relay 716 being in resting position, relay 711 is hooked by the contact 730.9 (sector 4). After the sector 3, the contact 735.13 is closed starting the alignment means (coil 768, line 847) which returns to resting position at the end of sector 4, the contact 730.13 is opened again. In sector 5, contact 730.12 is opened, cutting relay 756, causing the opening of the holding means (coil 766) and the stacking of the billet 11. After sector 6, contact 730.12 closes again, closing again the holding means. In sector 7 the contact 730.11 opens, deenergizing relay 757, withdrawing the fingers 321 of the safety means 320 of the first billet of the layer (coil 767). When the cyclical switch is astride the sectors 7 and 8, contacts 730.3 and 730.10 are closed, the former causing reenergizing of relay 733, the latter hooking relay 819, line 835, causing the platform (coil 763) to advance until restoration of the contact 7031 by the track of the odd layers of the drum 530 of the horizontal movements energizes relay 751 which cuts relay 719. The cyclical switch returns to its starting point, unhooking relay 735, which causes energizing of relay 734, operation of the sluice means and starting of the second billet 21; the platform is in a position to receive the latter.

It is noted that, for depositing the first billet 11, the horizontal placing of the platform is effected by relay 743 which also controls the safety device of the first billet, while for the subsequent billets this placement is controlled by relay 719 which is ineffective on this safety means. The same applies to the depositing of each layer, so that the fingers 321 are placed in the low position only for depositing the first billet of each layer; for the other billets; contact 730.11 is ineffective.

In a second part of the third step, relating to the depositing of the billet 12, the latter passes to the "zero point" and reenergizes via the contact 702, relay 733, resetting the cyclical switch and rehooking the relay 735, as has been explained with regard to the first part, and reclosing the sluice means.

The procedure of this part is analogous to that of the first part, with the only difference that with relay 711 being hooked, the contact 711.2 is closed, so that the closing of contact 730.8, the switch being astride sectors 3 and 4, causes the anchorage of the relay 712 and that the closing of contact 730.9 is ineffective, relay 711 already being hooked. The second billet 12 is thus deposited, the platform is placed in a position to receive the third billet, and the sluice means is open to release the latter. Relays 711 and 712 are hooked at the end of this portion.

The operations continue until the six billets are deposited, the six relays 711 to 716 are all hooked. However, the connection between points 8164 and 8165 is broken, contacts 721.1 and 716.2 being open, so that in sector 3 of the last cycle, where contact 730.2 is open, relays 711 to 715 are deenergized, only 716 remaining hooked, thanks to the contact 731.2. On the other hand, relay 717 being energized, relay 734 remains in resting position; the sluice means does not open.

In a fourth phase, the platform is put in position for depositing the second layer.

Relays 714, 715 and 722, being in resting position, the energizing of relay 716 places relay 717 under tension which, by feeding the platform descent coil 762, line 841, causes the descent of said platform because relay 749, line 8313, is in resting position, relay 732 being energized. This descent is stopped by the closing of the contact 7052, controlled by the feeler of the vertical movement drum 540 which energizes relay 722, line 822, which deenergizes relay 717, thus cutting the feeding of the coil 762. On the other hand, the contact 7051.1 is cut and contact 7052.2 is established, relay 721 is deenergized.

Relay 722 energizes relay 718, line 8346, which causes the platform (coil 764) recoil to the opening of contact 7042.2 and the closing of 7042.1, the latter energizing relay 745 which hooks relay 743 which causes the platform (coil 763) to advance until the contact 7032, closed by the feeler of the track of the even layers of the horizontal movement drum 530, energizes relay 752, which on the one hand cuts coil 763 and on the other hand deenergizes relay 718. The energizing of relay 743 also causes the placing in low position of the safety means of the first billet of the layer.

The platform is in place for depositing the first billet 21 of the second layer. Relay 734 is energized because the contact 716.5 which is open is shorted by the closed contacts 713.4, 714.5 and 715.6; the sluice means operates, as explained with regard to phase two.

The fifth phase relates to depositing the second layer, released by the passage of the billet 21 at the "zero point" with the closing of contact 707. The procedure is analogous with the one described with regard to phase 3, with some differences due to the fact that the relay 716 remained energized and relay 722 is under tension, while relay 721 is cut, and that contact 751.4 being in line 829, shorted by contact 722.2, relay 752, line 8362, acts on relay 743, said relay 752 being energized by contact 7032 of the track of the even layers of the horizontal displacement drum 530.

In a first part, corresponding to the depositing of the first billet the continuity of line 816 between conductor 802 and point 8161 is reestablished. During each cycle, as has been explained, the cyclical switch 730 successively "scans" relays 711 to 716, in the reversed order of their numbering when it is astride the sectors 1 and 2, it "scans" relay 716 already energized without changing anything. In sector 4, the contacts 730.2 and 730.9 are closed, permitting the hooking of relay 711 and the depositing of the billet 21, because relay 711 remains in resting position despite the hooking relay 716, because relay 722 becomes energized, contact 722.3 is broken. In sector 7, the opening of contact 730.11 is without effect, as has been explained with regard to part one of phase 3. When the cyclical switch is astride sectors 7 and 8, contact 730.10 is closed and hooks relay 719; relays 717 and 718 are in resting position, the former because 722 is energized, the latter, because 743 is itself unhooked, 745 being in resting position; the platform thus moves toward the horizontal depositing position of the second billet 22.

In the other parts of this phase, operations continue for depositing the subsequent billets but, during the fifth cycle, when relay 715 is hooked by the closing of the closing of contact 730.5 of the switch, contact 715.3 opens, cutting line 816 between points 8163 and 8164; relays 715 and 716 remain hooked, while relays 711 to 714 are deenergized. Relay 717 is energized blocking relay 734 and preventing the operation of the sluice means. Due to the preenergizing of relay 716, only five billets are deposited.

In a sixth phase, the platform is put in place to deposit the third layer. Relays 742 and 743 which, during the depositing of the first two layers, are excited directly by contacts 751.4 for the first layer and 752.2 for the second layer, are, for the following layers, energized by a relay 753 for the third, and 754 for the fourth layer.

With relays 714 and 723 in resting position, the energizing of relays 715 and 716 places relay 717 under tension, causing the descent of the platform (coil 762), said descent being stopped by the closing of contact 7052 which feeds relay 723 and deenergizes 717, cutting the feed to coil 762 and relay 718 is energized. Relay 722 on the other hand is deenergized.

Relay 718 causes the platform (coil 764) to retract until the opening of contact 7042.2 and the closing of 7041.1, the latter energizing the relay 745 which attracts relay 743 causing the platform (coil 763) to advance until the closing of contact 7031 by the feeler of the track of the odd layers of drum 530; this contact energizes relay 751 which, on the one hand, via relay 743 cuts coil 763, on the other hand it deenergizes relay 718. The energizing of relay 743 also causes the placing in low position of the safety means of the first billet of the layer.

The platform is in place for depositing the first billet 31 of the third layer. Relay 734 is energized, because the open contacts 716.5 and 715.6 are shorted by the closed contacts 713.4 and 714.5; the sluice means operates as has been explained with regard to phase 2.

Phase 7 relates to the depositing of the third layer, released by the passage of billet 21 at the "zero point" with closing of contact 708. The procedure is analogous to those described with regard to phases three and five; relays 716 and 715 remained energized, relay 723 is under tension, while 721 and 722 are cut; finally, relay 751 acts on relay 743, relay 751 being energized by contact 7031 of the track of the odd layers of drum 530, as in the depositing of the first layer.

By closing contacts 721.1 and 722.1, the continuity of the line 816 between conductor 802 and point 8161 is reestablished. During the cycle the cyclical switch successively "scans" relays 711 to 716 in the reversed order of their numbering; relays 716 and 715 already are hooked, so that nothing is changed when contacts 730.4 and/or 730.5 are closed. The switch thus hooks the first cycle relay 711, with the depositing of billet 31, it hooks to the second cycle 712 with the depositing of the billet 32, to the third cycle 713, with the depositing of billet 33, to the fourth cycle 714 with the depositing of billet 34. At that moment, the opening of contact 714.3 deenergizes relays 711 to 713, leaving relays 714 to 716 hooked; since relay 714 is not energized, relay 717 is placed under tension, which prevents any energizing of relay 734, which controls the sluice means; the latter remains closed.

The energizing of relay 717 causes, as has been explained with regard to phase 6, the placing of the platform into the position for depositing the fourth layer, the only differences being due to the fact that relays 717, prior to the energizing of relay 724 and 718, after the energizing of relay 724, are fed via the closed contacts 716.6, 715.7 and 714.6, that relay 719 is fed via the closed contacts 714.10, 715.11 and 716.10, and finally, that relays 742 and 743 are fed via relay 754.

The opening of the sluice means, after placement of the platform, causes the start of the cyclical switch 730 and the depositing of the three billets 41 to 43 with the hooking of the corresponding relays 711 to 713. The hooking of the latter causes the contact 713.3 to break and the unhooking of relays 711 and 712 with relays 713 and 716 remaining hooked. The result is the suppression of the feed of relays 734, that is the ban of the opening of the sluice means and the deenergizing of relay 732. The latter energizes relay 749; since the platform is not in the extreme low position, contact 7062.1 is closed, while contact 7062.2 is open. Relay 748 is thus in resting position, while relay 747 is hooked. The platform starts to descent (coil 762), until contact 7062.1 opens, cutting the current in coil 762 and stopping the descent movement. The twin contact 7062.2 is closed.

However, the energizing of relay 749 also causes the platform (coil 763) to advance until the breaking of contact 7041 stops the movement.

The closing of the contact 7062.2 causes the energizing of relay 746, deenergizing of relay 747 and consequently, hooking of relay 748; the platform takes on an ascending movement (coil 761), interrupted by the breaking of contact 7051.2.

The finished package is in high position and advanced, ready to be removed.

Thus, when the switch 700 is in the position corresponding to the closing of contacts 700.4 and 700.7, a package of type P1 is deposited.

It can be seen that the number of layers depends on the relays of series 711 to 716 by which relay 734 is served. If the depositing of four layers is desired, relay 734 is subjected to the four relays 713 to 716—contact 700.7; if the depositing of only three layers is desired, relay 734 is subjected to the three relays 714–716—contact 700.6; finally, if only two layers are desired, the service only relates to relays 715 and 716—contact 700.5. This connection is such that relay 734 is fed if at least one of the involved relays of series 711 to 716 is under tension, and not fed if all relays involved are cut. Thus, package P2 (six—five—four billets) are deposited by establishing the contacts 700.4 and 700.6.

If it is desired that the basic layer contains less than six billets, one or several relays are preenergized so as to reduce the number of billets deposited. Thus, when it is desired for the basic layer to contain only five billets, relay 711 is preenergized, thus closing contact 711.2. When the cyclical switch 730 "scans" in its first cycle the relays 716 to 711, relay 712 is energized by closing of contact 730.8 and the switch only travers five cycles, so that the stacker only deposits five billets. This is done by closing contact 700.1, contact 700.4 then being open. Likewise, if a basic layer of four billets is desired, both relays 711 and 712 are preenergized by simultaneous closing of contacts 700.1 and 700.2. Finally, if it is desired to deposit package P7 (three to two billets), the three relays 711 to 713 are preenergized by simultaneous closing of contacts 700.1 to 700.3.

Thus, by acting on contacts 700.1 to 700.4, one will act on the number of billets of the base layer while, by acting on contacts 700.5 to 700.7, one acts on the number of deposited layers.

It is noted that by passing from the deposited to the following layer, the reduction of the number of billets per layer is accomplished by preenergizing successively the relays of series 711 to 716 starting with the latter while, in order to reduce the number of billets of the base layer, the same relays are preenergized, but starting with the first one.

This stacker is applied in stacking billets or any cylindrical objects.

We claim:

1. A stacker for cylindrical billets independent of length and diameter D of the billets comprising a platform mounted for movement in a horizontal direction and in a vertical direction, an inclined feed plane mounted over the platform in vertically spaced relation and having a feed nozzle at the lower end portion of the feed plate, a billet holding member mounted for movement between blocking and unblocking position into and out of the path respectively of a billet moving over the feed nozzle for releasably holding a billet on the inclined plane, actuating means operatively engaging the platform for step by step translation in horizontal movement and other actuating means operatively engaging the platform for translation of same in vertical movement for alignment with the lower end of the inclined plane so that billets released by the holding member will drop to a platform supporting position in forming a stack of predetermined shape, thereon and means responsive to movement of the billets being stacked for controlling step by step translation of the platform whereby the platform is translated in the horizontal direction to permit the sequential depositing of billets to form a layer thereon and then translated in the vertical direction to permit the depositing of an additional layer of billets thereover.

2. A stacker as claimed in claim 1 in which the amount of vertical translation of the platform corresponds to a value D independent of the number of layers.

3. A stacker as claimed in claim 1 in which the amount of vertical translation of the platform corresponds to a value D after the first layer of billets is deposited and a value $\sqrt{3}/2$ D after each of the layers subsequent to the first.

4. A stacker as claimed in claim 1 in which the holding member is mounted for cooperation with the end of the feed nozzle to control the release of a billet for dropping off the end of the feed nozzle.

5. A stacker as claimed in claim 1 which includes a sluice means in an upper portion of the inclined plane for releasably engaging the lowermost billet on the plane and for releasing said billets one by one for continued passage downwardly over the inclined plane to the feed nozzle.

6. A stacker as claimed in claim 1 in which the holding means comprises a fixed shaft, talons hinged to said shaft for rocking movement for displacement of one end between blocking and unblocking position and means on the other end of the talon for rocking said talon about its pivot between blocking and unblocking position.

7. A stacker as claimed in claim 5 in which the sluice means comprises a shaft, a member mounted for pivotal movement about said shaft having a front holding nozzle and a rear holding nozzle with a spaced relationship therebetween dimensioned to receive a billet, power operated translation means operatively connected to said member for rocking movement about the pivot between operated and retracted positions with the front holding nozzle in retracted position to release a single billet from between said nozzle and the rear holding nozzle in blocking position to block movement of an oncoming billet when the member is in retracted position, and with the rear holding nozzle retracted to permit entry of an oncoming billet to between said nozzles and with the front holding nozzle in raised position to block movement of said billet from between said nozzles when in operated position.

8. A stacker as claimed in claim 1 which includes means for producing unstable packages including false billets and means for locating said false billets at the ends of selected layers for support of billets at the ends of the next layer during deposition of the billets to form the stack.

9. A stacker as claimed in claim 1 in which the control means comprises at least one model provided with materialized points representing the center of the billets in the package to be formed and at least one feeler in position to engage said materialized points, and means responsive to said feeler for immobilizing the platform when the feeler is opposite or in contact with a point.

10. A stacker as claimed in claim 9 in which the model comprises a track for the layers of odd rows, a track for the layers of even rows and a vertical track, materialized points per layer and a feeler scanning each track for materialized points.

11. A stacker as claimed in claim 10 which includes a drum mounted for rotational movement about a horizontal axis with the tracks of the odd layers and the tracks of the even layers arranged peripherally about said drum with the tracks for the even layers in position to be engaged by a feeler for the even layers and the tracks for the odd layers in position to be engaged by a feeler for the odd layers, and means for increment rotation of the drum responsive to horizontal movement of the platform.

12. A stacker as claimed in claim 9 which includes a vertical movement drum mounted for vertical movement, vertical movement tracks on the periphery of the drum in position to be engaged by the feeler for vertical movement, and means for movement of the drum responsive to vertical movement of the platform.

13. A stacker as claimed in claim 1 in which the control means comprises a billet counter for the billets deposited by layers including a rotary switch, a series of relays, the coils of each of said relays other than the first being in series with a preceding layer contact and a contact of the rotary cyclical switch, the contacts of said switch being adapted to shift successively for establishing themselves, said contact acting on the last relay being established first, said switch comprising another contact established later mounted in series in the feed circuit of a control coil of the holding means.

14. A stacker as claimed in claim 13 in which the control means for each billet layer of the package to produced comprises a relay energized by a contact adapted to be closed by the feeler of the vertical movement drum, a contact closed in resting position of each relay for cutting the feed of a coil which controls the vertical translation means of the platform and another contact cutting the feed of the relays energized during the depositing of a particular layer, except for the last which remains under tension.

15. A stacker as claimed in claim 14 in which the feed circuit of the coil controlling the sluice means comprises as many relays taken in the reverse order of numbering as there are layers in the package to be formed and having contacts mounted in parallel and closed in resting position.

* * * * *